United States Patent
Kim et al.

(10) Patent No.: US 11,067,028 B2
(45) Date of Patent: Jul. 20, 2021

(54) FUEL INJECTOR

(71) Applicant: Caterpillar Inc., Deerfield, IL (US)

(72) Inventors: Hoisan Kim, Dunlap, IL (US); Robert M. Campion, Chillicothe, IL (US); Steven C. Taylor, Washington, IL (US); Bao Feng, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/248,907

(22) Filed: Jan. 16, 2019

(65) Prior Publication Data

US 2020/0224603 A1    Jul. 16, 2020

(51) Int. Cl.
     *F02D 41/40*      (2006.01)
     *F02M 61/04*      (2006.01)
     *F02M 57/00*      (2006.01)

(52) U.S. Cl.
     CPC ......... *F02D 41/401* (2013.01); *F02M 57/005* (2013.01); *F02M 61/04* (2013.01); *F02D 2200/0618* (2013.01); *F02M 2200/9038* (2013.01)

(58) Field of Classification Search
     CPC .... F02M 57/005; F02M 61/04; F02M 65/005; F02M 2200/9038; F02D 41/401
     See application file for complete search history.

(56) References Cited

U.S. PATENT DOCUMENTS

| | | | |
|---|---|---|---|
| 3,942,366 A * | 3/1976 | Hofmann | F02M 65/005 73/114.47 |
| 4,181,010 A * | 1/1980 | Knape | F02M 65/005 200/82 D |
| 5,595,215 A | 1/1997 | Wallace et al. | |
| 6,253,736 B1 | 7/2001 | Subramani | |
| 6,691,936 B2 * | 2/2004 | Yudanov | F02M 65/005 239/533.9 |
| 6,739,575 B2 | 5/2004 | Cotton, III et al. | |
| 7,520,266 B2 * | 4/2009 | Barnes | F02M 57/02 123/198 D |
| 9,551,309 B2 | 1/2017 | Filippi et al. | |
| 9,726,126 B2 * | 8/2017 | Moreau | F02M 61/20 |
| 10,100,794 B2 * | 10/2018 | Barbier | F02M 61/168 |

(Continued)

FOREIGN PATENT DOCUMENTS

| | | |
|---|---|---|
| DE | 102005049259 B3 | 1/2007 |
| EP | 0059733 B1 | 11/1985 |

(Continued)

*Primary Examiner* — Alex M Valvis
(74) *Attorney, Agent, or Firm* — Bookoff McAndrews (57) ABSTRACT

A fuel injector system includes an injector body having a proximal end and a distal end, the injector body defining a nozzle having an outlet. The injector system includes a spill valve fluidly connected to the outlet and having a spill valve member movable between an open position and a closed position. The injector system includes a control valve including a control valve member movable between an open position and a closed position. The injector system includes a check valve fluidly connected to the outlet, the control valve including a check valve needle movable between an open position and a closed position. The injector system also includes an electrical monitoring circuit configured to output a signal indicative of at least one of the open position or the closed position of the spill valve member.

19 Claims, 8 Drawing Sheets

(56) References Cited

U.S. PATENT DOCUMENTS

| | | | |
|---|---|---|---|
| 2003/0106533 A1 | 6/2003 | Crofts | |
| 2007/0289576 A1 | 12/2007 | Barnes | |
| 2009/0087673 A1* | 4/2009 | Taylor | F02M 61/168 428/472 |
| 2010/0006675 A1* | 1/2010 | Boecking | F02M 51/0603 239/533.2 |
| 2017/0211533 A1 | 7/2017 | Barbier et al. | |
| 2017/0268473 A1* | 9/2017 | Legrand | F02M 51/005 |
| 2019/0120188 A1* | 4/2019 | Thibault | F02M 51/005 |

FOREIGN PATENT DOCUMENTS

| | | |
|---|---|---|
| EP | 3208456 A1 | 8/2017 |
| EP | 3228858 A1 | 10/2017 |
| GB | 2547684 | 8/2017 |

\* cited by examiner

FUEL INJECTOR

TECHNICAL FIELD

The present disclosure relates generally to fuel injectors for internal combustion engines, and more particularly, to control aspects of fuel injectors.

BACKGROUND

MEUI (mechanical electric unit injection) injectors are used in internal combustion engines to control fuel delivery to combustion cylinders. In order to optimize engine-out combustion emission, the minimum injection time for MEUI injectors should be monitored and controlled. Current MEUI injectors are limited in their ability to monitor, control, and adjust injection sequences. For example, certain injectors monitor injection sequences solely based on control signals output to one or more components of the fuel injector, e.g., one or more electrically-controlled valves of the fuel injector. To provide improved monitoring of injection sequences, some fuel injector system include a circuit that provides simple feedback on the injection sequence. One example of a fuel injector system including such a circuit is disclosed in U. S. Patent Application Publication No. 2017/0211533 published to Barbier et al. on Jul. 27, 2017 ("the '533 publication"). The fuel injector system of Barbier monitors electronic connection of a circuit through a check valve of the fuel injector system. While the '533 publication discloses a device for monitoring the movement of check valve of the fuel injector via a circuit, the performance and accuracy of the disclosed fuel injector may be improved.

The fuel injector of the present disclosure may solve one or more of the problems set forth above and/or other problems in the art. The current scope of the disclosure, however, is defined by the attached claims and not by the ability to solve any specific problem.

SUMMARY OF THE DISCLOSURE

In one aspect, a fuel injector system may include an injector body having a proximal end and a distal end, the injector body defining a nozzle having an outlet at a distal end of the injector body. The injector system may include a spill valve fluidly connected to the outlet, the spill valve having a spill valve member movable between an open position and a closed position. The injector system may include a control valve, the control valve including a control valve member movable between an open position and a closed position. The injector system may include a check valve fluidly connected to the outlet and the control valve, the check valve including a check valve needle movable between an open position and a closed position. The injector system may also include an electrical monitoring circuit including the control valve member and the spill valve member, the monitoring circuit configured to output a signal indicative of at least one of the open position or the closed position of the spill valve member.

In another aspect, a fuel injector system may include a mechanically actuated, electronically controlled unit fuel injector. The fuel injector may include an injector body having a proximal end and a distal end, the injector body defining a nozzle having an outlet at the distal end of the injector body. The fuel injector may include a spill valve fluidly connected to the outlet, the spill valve having a spill valve member movable between an open position and a closed position and a check valve fluidly connected to the outlet and the control valve, the check valve including a check valve needle movable between an open position and a closed position. The fuel injector may also include an electrical monitoring circuit including the control valve member, the spill valve member, and the injector body.

In yet another aspect, a method of operating a fuel injector may include: moving a spill valve of a fuel injector to a closed position, and moving a control valve from a first configuration to a second configuration, wherein moving the control valve to the second configuration causes a check valve to open. The method may include detecting the position of the spill valve using an electrical monitoring circuit, the monitoring circuit including the control valve, the spill valve, and a controller, and determining an actual injection time based at least in part on the detected position of the spill valve. The method may also include comparing the determined actual injection time to a desired injection time to produce an adjusted timing signal, and operating the fuel injector according to the adjusted timing signal.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, relative terms, such as, for example, "about," "substantially," "generally," and "approximately" are used to indicate a possible variation of ±10% in a stated value or characteristic.

Figure 1:
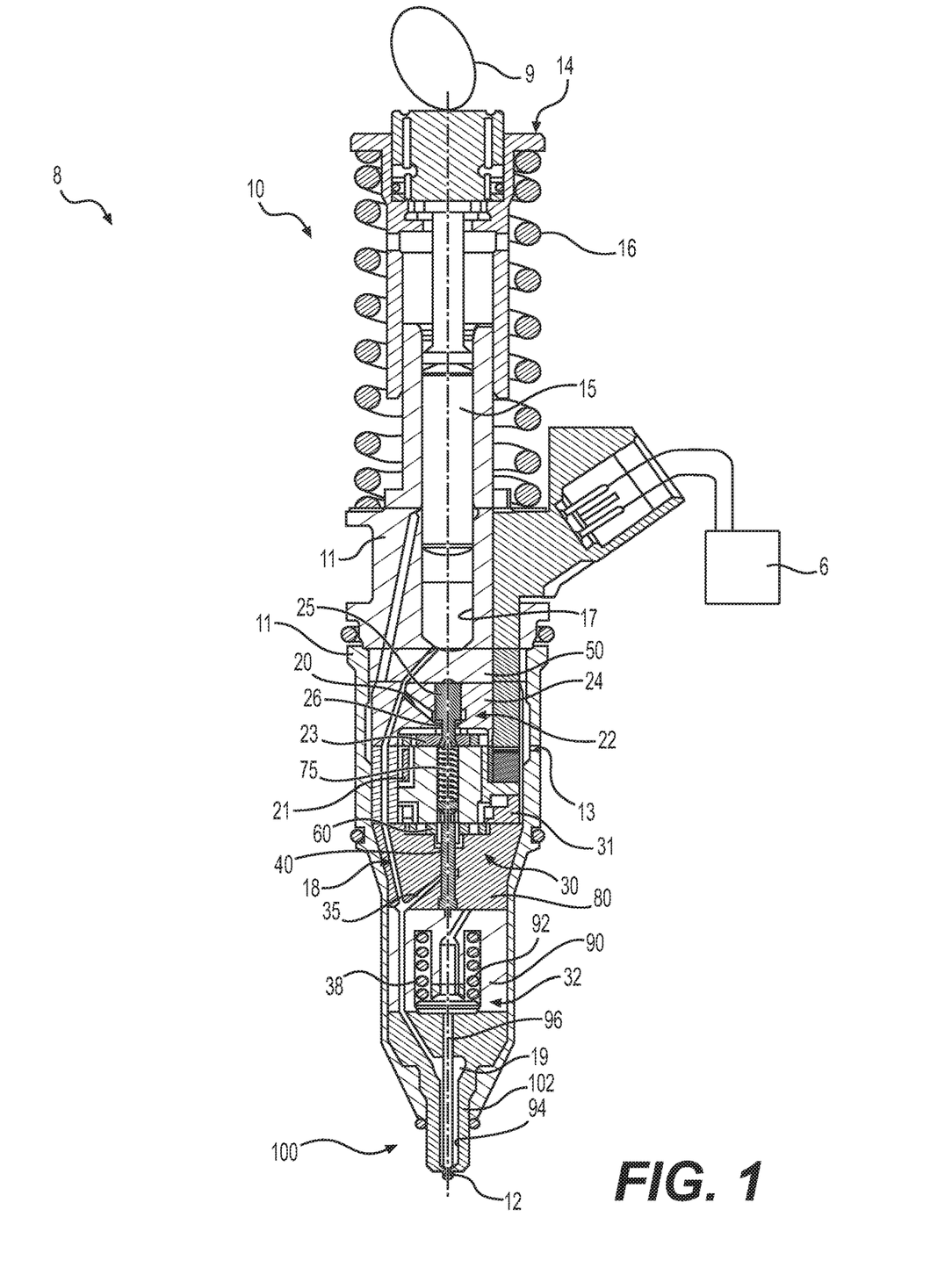
FIG. 1 is a sectional view of a fuel injector of a fuel system of an internal combustion engine.

FIG. 1 illustrates a fuel injector system 8 which includes a fuel injector 10 and a controller 6. Fuel injector 10 is, for example, a mechanically actuated electronically controlled unit fuel injector (MEUI) that is controlled at least in part by controller 6. Fuel injector 10 includes an injector body 11 defining a fuel supply/return orifice 13 and a pressure chamber 17. Injector body 11 forms an exterior body of fuel injector 10. Injector body 11 defines a distal end at nozzle 100 and a proximal end at tappet 14. The interior of fuel injector 10 includes a piston 15 movably disposed within the pressure chamber 17. Piston 15 is linked to move with tappet 14 as is known in the art. A tappet spring 16 acts on the tappet 14 to bias the tappet 14 toward a first position where the piston 15 is positioned to enlarge the pressure chamber 17. A cam 9 acts on the tappet 14 to move the piston 15 distally, thereby compressing fuel within the pressure chamber 17.

The pressure chamber 17 may be fluidly coupled to nozzle 100 of the fuel injector 10 via a nozzle supply passage 18. In an exemplary configuration, the nozzle supply passage 18 is formed by a plurality of components disposed within the injector body 11. In this exemplary configuration, the nozzle supply passage 18 is formed in part by a spill valve 22, a direct operated control (DOC) valve 30, a check valve 32, and the nozzle 100.

Figure 2:
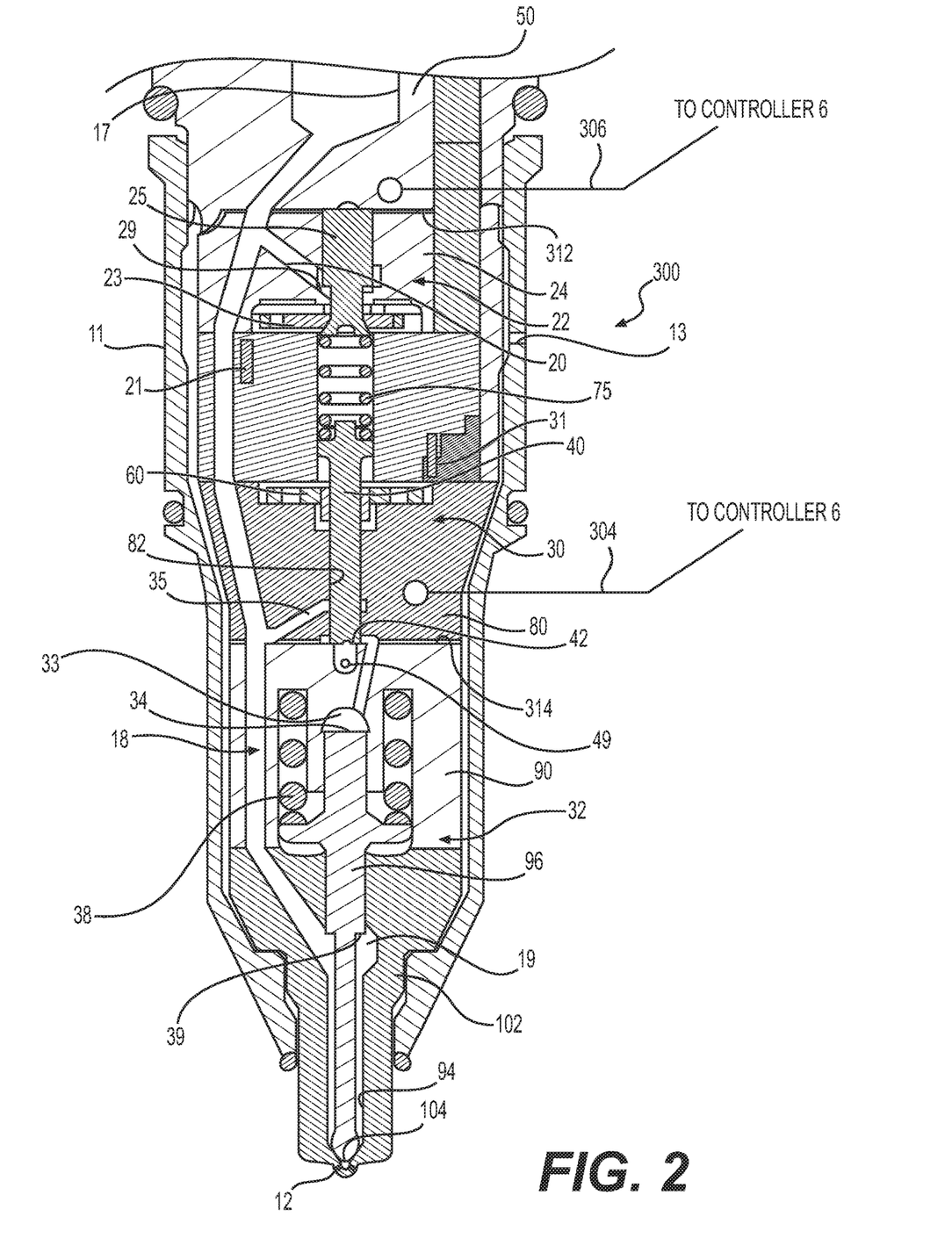
FIG. 2 is a partially schematic sectional view of the fuel injector of FIG. 1 configured to form a first circuit.
Figure 3:
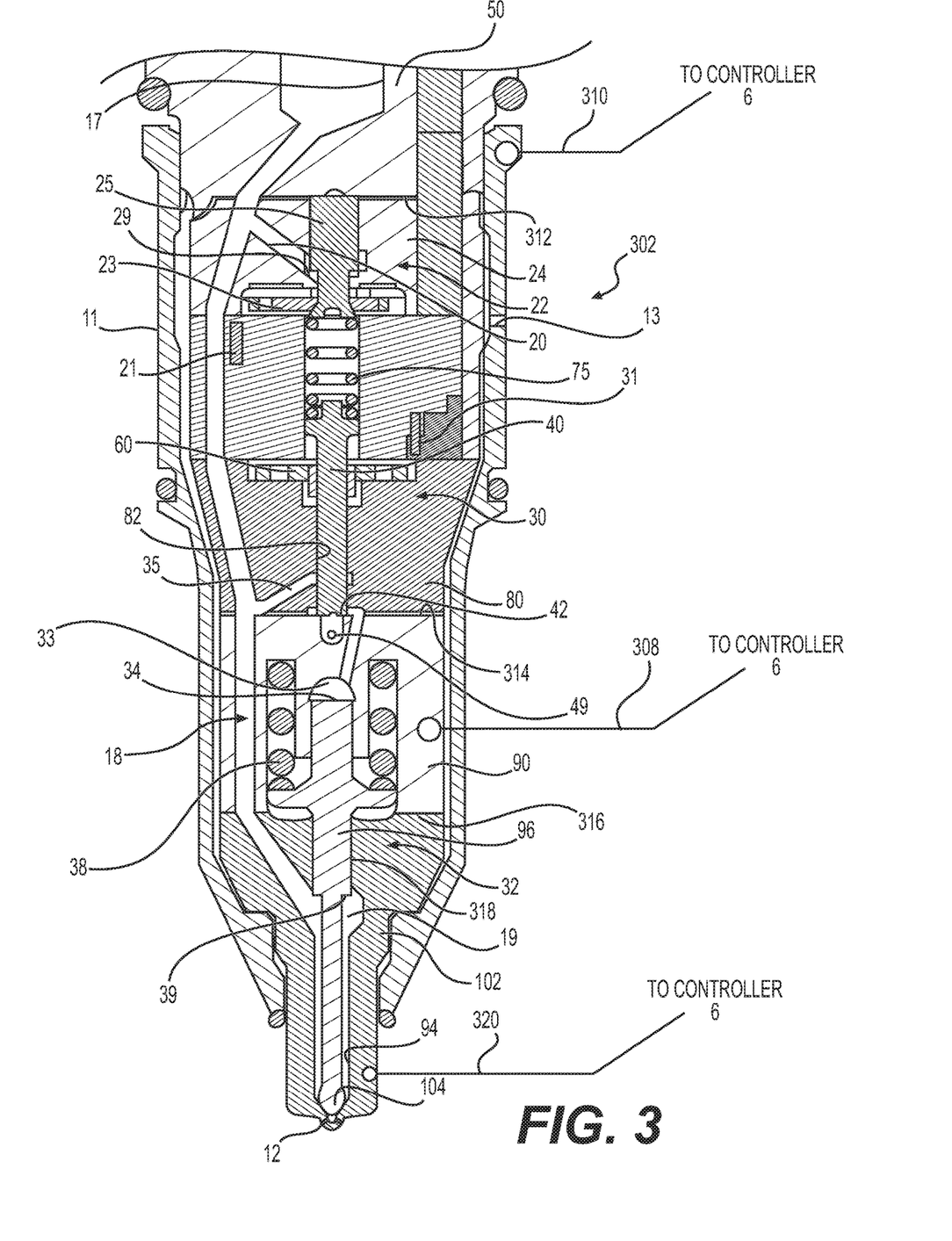
FIG. 3 is a partially schematic sectional view of the fuel injector of FIG. 1 configured to form a second circuit.

As illustrated in FIGS. 1-3, the spill valve 22 includes a spill valve body 24 that defines a spill passage 20 and a spill valve bore 26. The spill valve bore 26 may be fluidly connected to the pressure chamber 17, via the nozzle supply passage 18 and the spill passage 20. In addition, the spill valve bore 26 may be fluidly connected to the fuel supply/return opening 13, via a return passage (not shown). A spill valve member 25 is disposed within the spill valve bore 26 to move between an open position and a closed position, as is known in the art. For example, the spill valve member 25 may be urged by spring 75 out of contact with spill valve seat 29 when in the open position, thereby allowing the fuel from pressure chamber 17 to drain to fuel supply/return opening 13. The spill valve 22 can include a first armature 23 fixedly coupled to the spill valve member 25. The first armature 23 may be located adjacent a first solenoid 21 to controllably move valve member 25 between the open position and the closed position. For example, when the first solenoid 21 is actuated, the first armature 23 can be drawn toward first solenoid 21 to move valve member 25 to the closed position on valve seat 29, to thereby block fuel from pressure chamber 17 from draining to fuel supply/return opening 13. In the closed position of valve member 25, pressure can be built up in a nozzle chamber 19 for injection from fuel injector 10.

The DOC or control valve 30 may include a DOC valve body 80 defining a pressure connection passage 35 and a DOC valve bore 82. A DOC or control valve member 40 disposed within the DOC valve bore 82 may be movable between an open and closed position on valve seat 42 to fluidly lock and unlock the check valve 32 as is known in the art. For example, spring 75 may bias DOC valve member 40 toward the closed position on valve seat 42 so that fuel in needle control chamber 33 is unable to escape, thus restricting movement of check valve 32. The DOC valve member 40 may be fixedly coupled to a second armature 60 and located adjacent a second solenoid 31. Actuation of second solenoid 31 may move valve member 40 off of valve seat 42 and connect the needle control chamber 33 to low pressure passage 49, thereby allowing for movement of check valve 32 to an open position.

The check valve 32 includes a check valve body 90 defining the needle control chamber 33, an annular chamber 92, and a portion of the nozzle supply passage 18. Check valve body 90 may also include low pressure seat 42. A check valve spring 38 may be disposed within the annular chamber 92. A needle 96 of the check valve 32 is received by the check valve body 90 within the annular chamber 92. The check valve 32 is positioned adjacent to a nozzle body 102 of the nozzle 100 such that the needle 96 extends into a check valve bore 94 of the nozzle body 102.

With continued reference to FIGS. 2 and 3, the needle 96 is operable to open or close the check valve 32 by selectively pressurizing nozzle chamber 19 and relieving the needle control chamber 33, as is known in the art. For example, the nozzle chamber 19 can be selectively pressurized via the nozzle supply passage 18 based on the position of spill valve 22, and needle control chamber 33 can be relieved by opening DOC valve 30. The nozzle body 102 may define a check valve seat 104 such that the needle 96 rests against the check valve seat 104 to block the nozzle chamber 19 from nozzle outlets 12. The check valve spring 38 may bias the needle 96 so that the needle 96 rests against the check valve seat 104 thereby blocking the nozzle chamber 19 from the nozzle outlets 12. When there is sufficient pressure in nozzle chamber 19 and DOC valve 30 is open, needle 96 will rise off of check valve seat 104 to open nozzle outlets 12 and inject fuel from fuel injector 10 and into a combustion chamber (not shown).

The controller 6 of injector system 8 may be operably or electrically connected to components of the fuel injector 10 including, first solenoid 21 and second solenoid 31. The controller 6 can include a microprocessor or other controller known in the art. The controller 6 can be integrated with or linked to an engine control module (ECM), although it is contemplated that the controller 6 can instead be provided as a stand-alone controller. Information related to the operation of the fuel injector 10, e.g., circuit operation and timing information for spill valve 22 and DOC valve 30, may be stored in a memory of the controller 6. The controller 6 is in communication with the first solenoid 21 and the second solenoid 31 to operate the first solenoid 21 and the second solenoid 31 in accordance with control signals generated by controller 6.

The fuel injector system 8 includes one or more circuits, such as a first monitoring circuit 300 (FIG. 2) and a second monitoring circuit 302 (FIG. 3), as will be discussed in further detail below. The fuel injector 10 includes one or more insulative coatings as part of the one or more circuits. Although described herein as insulative coatings, it will be apparent to those of skill in the art that an insulative member may be used in place of one or more of the insulative coatings. As used herein, an insulative coating described as being disposed or provided "between" two components encompasses on one or more of: an insulative coating on one of the two components, an insulative coating on both of the two components, or an insulative member between the two components.

FIG. 2 illustrates the components of first circuit 300 of injector system 8. As shown in FIG. 2, the first circuit 300 includes a lead or electrode 304 coupled between the controller 6 and the DOC valve body 80. The first circuit 300 further includes a lead or electrode 306 coupled to an interior body portion or interior body 50 of the injector 10. Electrodes 304 and 306 are operably (electrically) connected to controller 6 and respectively to interior body 50 and DOC valve body 80, in any conventional manner. Interior body 50 is a body portion of fuel injector 10 and can be in electrical communication with spill valve member 25 when spill valve member 25 is disposed on interior body 50. Additionally, check valve body 90 may be operably (electrically) connected to electrode 306, for example via nozzle body 102 and/or fuel injector body 11, in any conventional manner.

The first circuit 300 of fuel injector 10 includes a first insulative coating 312 provided between interior body 50 and spill valve body 24 of spill valve 22. In one aspect, first insulative coating 312 is provided between interior body 50 and spill valve body 24. Electrode 306 may be provided on an interior of fuel injector 10 at a position on or within interior body 50 or at a position on injector body 11, provided that the position on injector body 11 is in electrical communication with spill valve member 25 and electrically connected to the remaining components of the first circuit 300 when first circuit 300 is closed.

With continued reference to FIG. 2, a second insulative coating 314 can be provided between DOC valve body 80 and check valve body 90. First insulative coating 312 and second insulative coating 314 extend circumferentially within fuel injector 10.

Figure 4A:
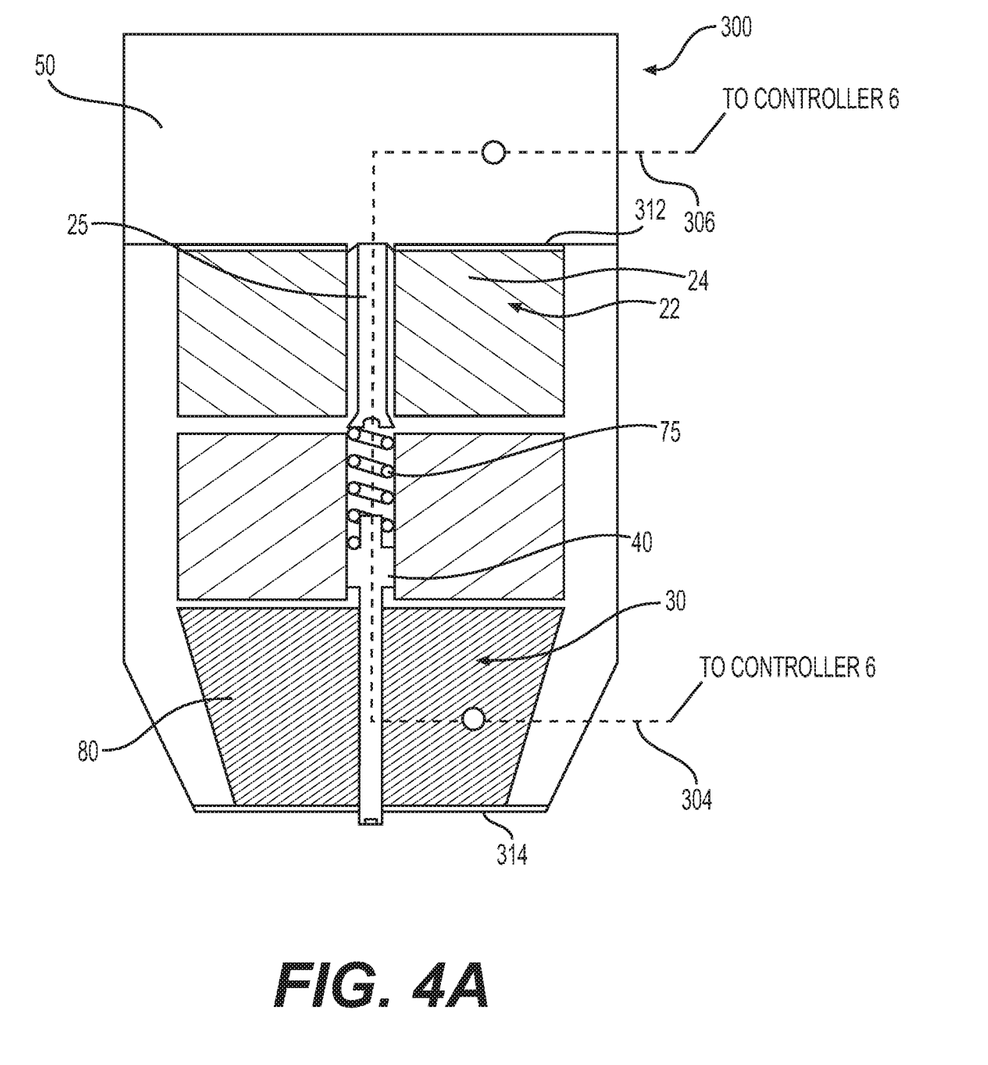
FIGS. 4A and 4B are partially schematic views illustrating electronic circuits of the fuel injectors of FIGS. 2 and 3, respectively.

FIG. 4A illustrates a schematic circuit path for the first circuit 300. As shown in FIG. 4A, the first circuit 300 may operably (or electrically) connect the controller 6 with electrode 304, the DOC valve body 80, the DOC valve member 40, the spring 75, the spill valve member 25, and the interior body 50, the electrode 306, and the controller 6. The first circuit 300 may be closed (in an electrically conductive state) when the spill valve member 25 is fully open and in contact with interior body 50. The first circuit 300 may be open when the spill valve member 25 is actuated by first solenoid 21, moving into contact with valve seat 29, and DOC valve member 40 is actuated by second solenoid 31, moving out of contact with low pressure seat 42. Thus, the open or closed condition of first circuit 300 may provide an output that is indicative of an operation of both spill valve 22 and DOC valve 30. Controller 6 can apply a signal such as a 5V signal across electrodes 304 and 306. In an alternative configuration, an insulative coating may be provided between a distal end of DOC valve member 40 and low pressure seat 42. With such an insulative coating, the position of DOC valve member 40 does not alter the state of first circuit 300. Thus, first circuit 300 may be open when at least one of the spill valve member 25 is in the closed position or the DOC valve member 40 is in the open position.

FIG. 3 illustrates a second circuit 302 of injector system 8. As shown in FIG. 3, second circuit 302 may include three leads or electrodes. Electrode 308 is coupled between the controller 6 and check valve body 90. The second circuit 302 includes an electrode 310 coupled between controller 6 and the injector body 11. Second circuit 302 also includes electrode 320 coupled between controller 6 and nozzle body 102. Electrodes 308, 310, and 320 are operably (electrically) connected to the controller 6 and the check valve body 90, injector body, and nozzle body 102, respectively, in any conventional manner. To provide a desired flow of signals within second circuit 302, nozzle body 102 and injector body 11 can be spaced apart so as to be electrically insulated from each other. Alternatively, an insulative coating can be provided between nozzle body 102 and injector body 11.

The second circuit 302 includes first insulative coating 312 provided between interior body 50 and spill valve body 24 and second insulative coating 314 provided between DOC valve body 80 and check valve body 90. In addition to the first and second insulative coatings 312 and 314, second circuit 302 may include a third insulative coating 316 provided between nozzle body 102 and check valve body 90, as well as a fourth insulative coating 318 provided between needle 96 and nozzle body 102. Like first and second insulative coatings 312 and 314, third and fourth insulative coatings 316 and 318 extend circumferentially so as to electrically isolate the components of the second circuit 302.

Figure 4B:
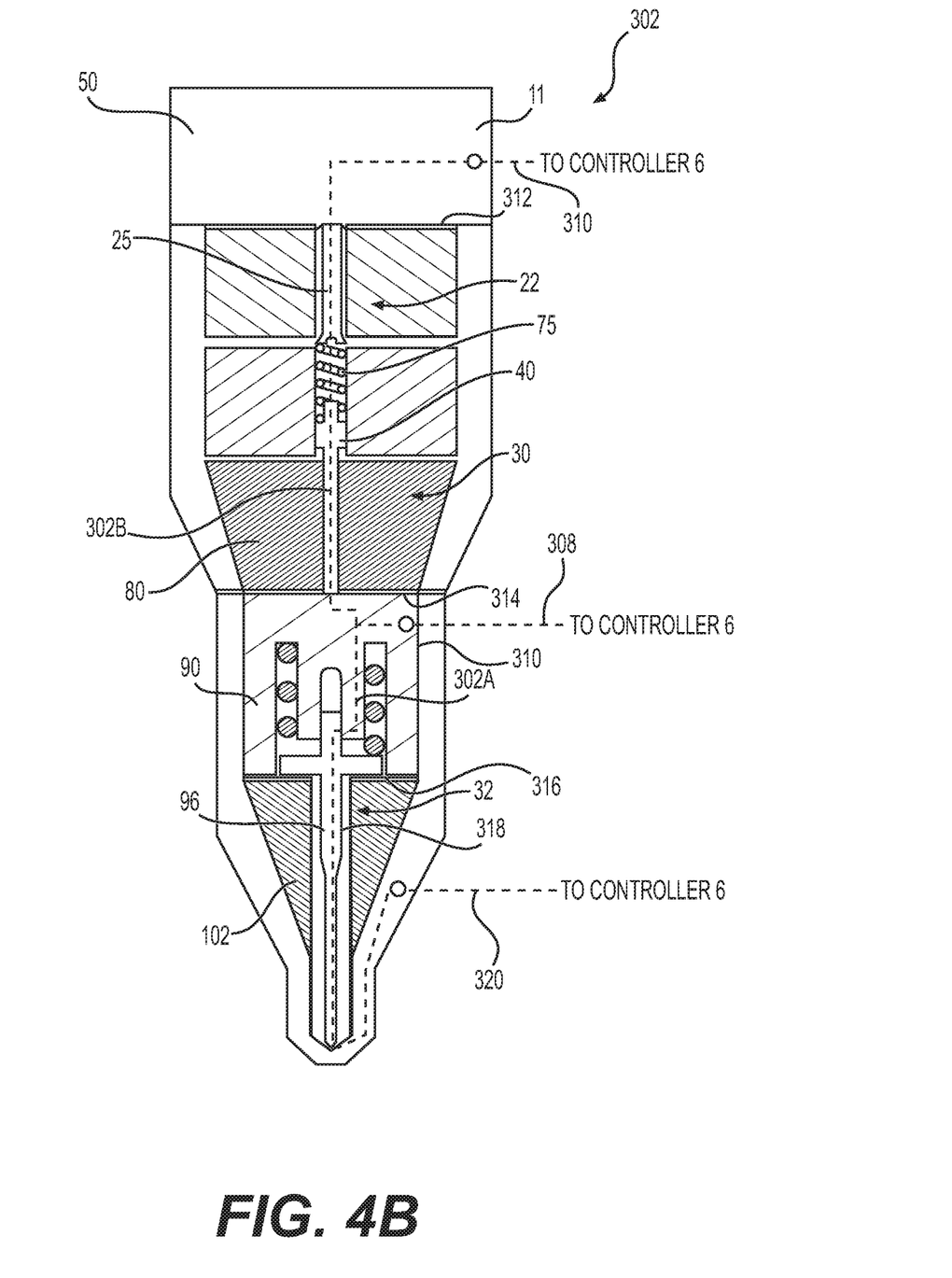

FIG. 4B illustrates a circuit path for the second circuit 302. As shown in FIG. 4B second circuit 302 operably (or electrically) connects controller 6 with electrode 320, electrode 308, electrode 310, nozzle body 102, needle 96, DOC valve member 40, spring 75, spill valve member 25, interior body 50, and injector body 11. Thus, second circuit 302 includes a first path 302A and a second path 302B. First and second paths 302A and 302B may have approximately equal electrical resistances. In one aspect, the electrical resistance of first path 302A and second path 302B is approximately zero. The first path 302A of second circuit 302 extends from electrode 308 to electrode 320. The second path 302B of second circuit 302 extends from electrode 308 to electrode 310. Controller 6 can apply a signal such as a 5V signal across electrodes 308, 310, and 320. FIG. 4B illustrates second circuit 302 in a closed (electrically conductive) state in which both the first path 302A and the second path 302B are closed. When a signal is applied by controller 6 across the electrodes in this state, both first path 302A and second path 302B return the signal to the controller via electrode 320 and electrode 310, respectively, allowing controller 6 to detect a signal through a plurality of paths of second circuit 302.

First path 302A of second circuit 302 may be closed when the needle 96 rests against the check valve seat 104. The first path 302A may be open when the needle 96 moves away from the check valve seat 104. Thus, first path 302A can provide an output that is indicative of an operation of check valve 32 and a position of needle 96 to allow controller 6 to determine a timing at which check valve 32 is in the open position or the closed position.

Second path 302B of second circuit 302 can be closed when the spill valve member 25 rests on the interior body 50 or check valve member 40 rests on low pressure seat 42. Second path 302B can be open when the spill valve member 25 moves out of contact with interior body 50 toward valve seat 29 and when DOC valve member moves out of contact with low pressure seat 42 and against spring 75. Thus, second path 302B can provide an output that is indicative of the combined operation of spill valve 22 and DOC valve 30 to allow controller 6 to determine a timing at which spill valve 22 and DOC valve 30 is in the open position or the closed position.

The first circuit 300 and the second circuit 302 are each examples of circuits that may be employed to detect the state of one or more components of injector 10. Various elements of injector 10 may be isolated and/or insulated by insulative coatings to form one or more desired circuits.

INDUSTRIAL APPLICABILITY

The fuel injector system and fuel injector disclosed herein may be applied to any engine utilizing electrically controlled fuel injectors. For example, fuel injector system 8, fuel injector 10, and the methods of operating fuel injector 10 disclosed herein may help to improve the accuracy and timing of the operation of the fuel injector 10, thereby improving performance and efficiency of an engine containing the fuel injector 10 and controller 6 of fuel injector system 8. In addition, fuel injector system 8 and fuel injector 10 may effectively identify performance issues and identify the valve(s) responsible for the undesired performance.

Fuel injector 10 may perform fuel injection in any conventional manner. Referring to FIG. 1, during an injection sequence, cam 9 rotates to allow the tappet 14 to move upward, drawing the piston 15 upward to pull fuel into the pressure chamber 17 from the fuel supply/return opening 13.

Initially, the spill valve 22 is in a passive or open state such that fuel can flow through the spill passage 20 to the fuel supply/return opening 13. The check valve 32 may initially be closed such that the needle 96 rests against the check valve seat 104 blocking fuel from exiting through nozzle outlets 12. As the cam 9 continues to rotate, the cam 9 may act upon the tappet 14 thus moving piston 15 downward to compress fuel within the pressure chamber 17. The controller 6 may activate the first solenoid 21 to close spill valve 22 pressurizing fuel in the nozzle chamber 19. The closure of spill valve is reflected in FIGS. 5 and 6 by the movement of spill valve member 25 from a fully open position to a closed position.

To initiate injection, the controller 6 may activate the second solenoid 31 to move the DOC valve member 40 off valve seat 42, thereby reducing the fuel pressure within needle control chamber 33. Increased pressure within the nozzle chamber 19 from the pressurized fuel may act on an opening hydraulic surface 39 to overcome the pressure within the needle control chamber 33 and the force of the needle valve spring 38, and thereby open the check valve 32. Once open, the check valve 32 will release fuel into the combustion chamber through the nozzle openings 12.

Figure 5:
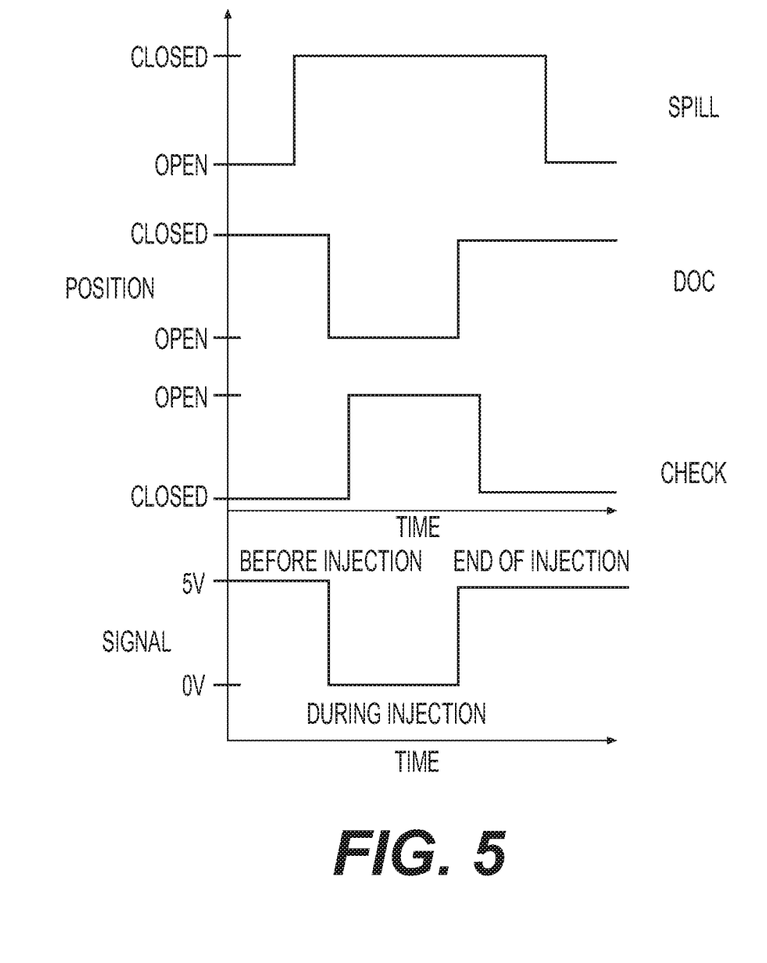
FIG. 5 is a plot of the movement of the spill valve, the DOC valve, and the check valve and of the voltage signal of the first circuit through an exemplary injection using the fuel injector of FIG. 2.
Figure 6:
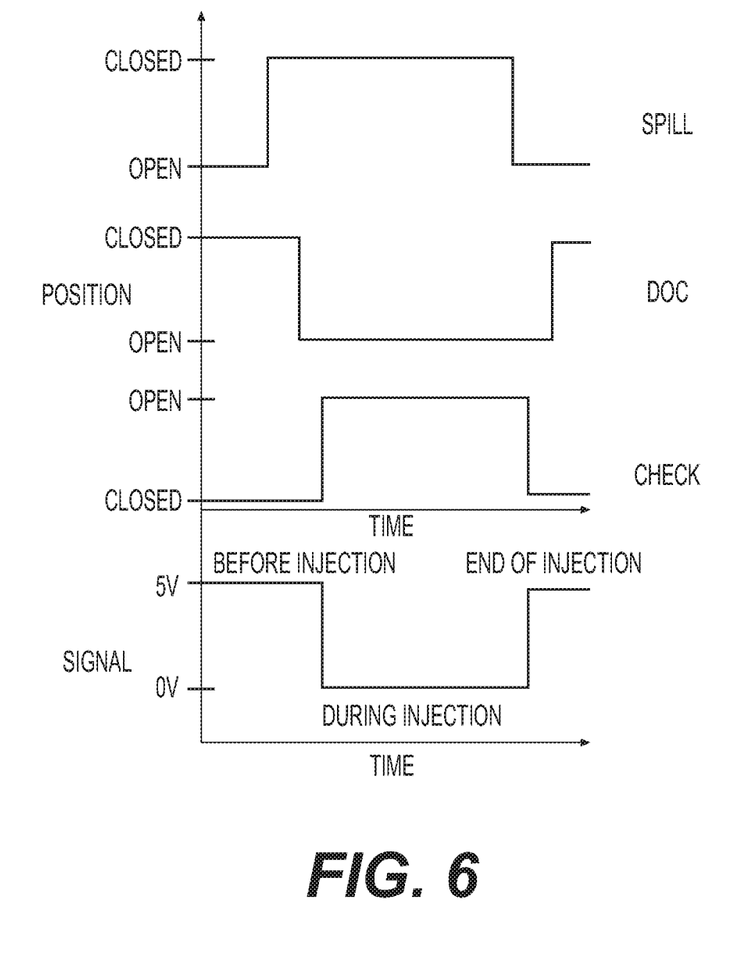
FIG. 6 is a plot of the movement of the spill valve, the DOC valve, and the check valve and of the voltage signal of the second circuit through an exemplary injection using the fuel injector of FIG. 3.

To end injection, the controller 6 may signal the second solenoid 31 to de-activate, moving the DOC valve member 40 back into contact with valve seat 42. The pressure within the needle control chamber 33 may increase as DOC valve member 40 allows fuel to pass to needle control chamber 33 via pressure connection passage 35 and one or more annular recesses (not shown) within DOC valve member 40. The increased pressure within the needle control chamber 33 acting on the closing hydraulic surface 34 of the needle 96 closes the check valve 32 ending the release of fuel. Accordingly, the actuation of the second solenoid to move the DOC valve member 40 to the low-pressure valve seat 42 from the high-pressure valve seat 41 can complete or limit the injection event, as reflected by the movement of the DOC valve member 40 shown in FIGS. 5 and 6. FIGS. 5 and 6 illustrate, in upper portions thereof, plots representing the relative positions of the spill valve 22, DOC valve 30, and check valve 32. In each of FIGS. 5 and 6, an open state of spill valve 22 is indicated by a lower level, while a higher level indicates a closed state of spill valve 22. An upper level in the plot for DOC valve 30 indicates a closed state, while a lower level indicates an open state. Finally, a lower level in the plot for check valve 32 indicates a closed state, while an upper level indicates an open state.

FIG. 5 illustrates an output of first circuit 300 during the above-described injection event. As illustrated in FIG. 5, first circuit 300 is initially at a closed state. A signal, for example a 5V signal, can be continuously provided across electrodes 304 and 306 by controller 6. To initiate the injection event, controller 6 closes spill valve 22 by causing spill valve member 25 to move away from interior body 50 and toward valve seat 29. Shortly thereafter, controller 6 opens DOC valve 30 by causing DOC valve member 40 to move from a position in contact with check valve body 90 to a position spaced apart from check valve body 90. The movement of spill valve member 25 from interior body 50, with the movement of DOC valve member 40 from check valve body 90, opens first circuit 300. Thus, the 5V signal is not received across electrodes 304 and 306 when both the spill valve member 25 moves away from interior body 50 and the DOC valve member 40 moves away from check valve body 90. The 5V signal is present in the time between movement of the spill valve member 25 to the closed position and the movement of DOC valve member 40 to the open position, as electrodes 304 and 306 may remain electrically connected to each other via DOC valve member 40, check valve body 90, nozzle body 102, and injector body 11. As can be seen in FIG. 5, the closure of spill valve 22 and the opening of DOC valve 30, therefore corresponds to a signal of 0V due to the open state of first circuit 300. At the completion of the injection event, spill valve 22 opens and spill valve member 25 again contacts interior body 50, and DOC valve member 40 moves into contact with low pressure seat 42 of check valve body 90, closing the circuit. Thus, the signal indicated by first circuit 300 returns to 5V.

FIG. 6 illustrates an output of second circuit 302 during an exemplary injection event. Turning first to FIG. 6, second circuit 302 is initially in a closed state. A signal, for example a 5V signal, can be continuously applied across electrodes 308, 310, and 320 by controller 6. As illustrated in FIG. 6, controller 6 initiates an injection event by causing spill valve 22 to move from a open position to a closed position. During this movement, spill valve member 25 moves away from interior body 50, causing second path 302B of second circuit 302 to open. However, when spill valve 22 moves to an open configuration, check valve 32 remains in a closed configuration as needle 96 remains in contact with check valve seat 104. Thus, second path 302B of second circuit 302 remains closed, and the signal measured by controller 6 remains at 5V across second path 302B.

Subsequently, when check valve 32 is opened when needle 96 moves to an open position, second path 302B opens. At this time, both first path 302A and 302B are open and the 5V signal is not passed by either path, signaling the beginning of the injection event. As can be seen in FIG. 6, when DOC valve 30 subsequently returns to closed position, first path 302A remains open as spill valve member 25 remains away from spill valve seat 29. Thus, neither the first path 302A nor the second path 302B closes until needle 96 returns to check valve seat 104. At that time, first path 302A may provide the signal of 5V to controller 6 signaling the end of the injection event, as shown in FIG. 6.

Figure 7:
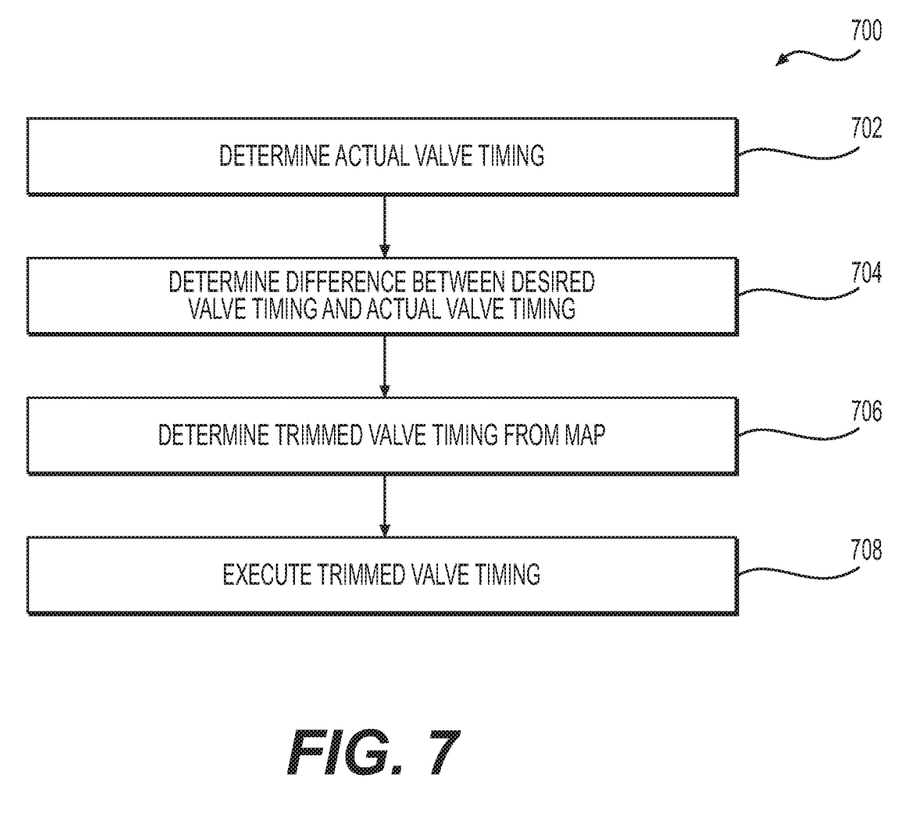
FIG. 7 is a flow chart of a method to operating the injector system of FIG. 1.

FIG. 7 illustrates an exemplary method 700 for adjusting operation of fuel injector 10 by monitoring the timing of the injection sequence in accordance with the operation of the first circuit 300 and/or the second circuit 302. At a step 702, the actual valve timing may be determined based on the operation of the first circuit 300 and/or the second circuit 302.

For example, the timing when the first circuit 300 opens and closes during the injection sequence, can be used to determine the actual timing of the fuel injector 10. This determination can be based at least in part on the period during which the signal is 0V due to the open state of first circuit 300. As noted above, first circuit 300 can output a signal that is indicative of a state of spill valve 22 and DOC valve 30. Thus, controller 6 can determine actual valve timing based on the detected state of spill valve 22 and DOC valve 30. However, in embodiments where an insulative coating is provided between a distal end of DOC valve member 40 and low pressure seat 42, controller 6 may be configured to determine the actual valve timing based on the detected state of spill valve 22 alone.

Step 702 can include determining the actual timing of the fuel injector 10 based at least in part on the timing when the first circuit 300 or the second circuit 302 opens and closes during the injection sequence. As second circuit 302 may include first path 302A and second path 302B, second circuit 302 provides a signal indicative of the operation of spill valve 22 and DOC valve 30, as well as check valve 32.

Second circuit 302 provides a signal that may closely correspond to a period of actual injection due to the first path 302A and second path 302B.

Next, at a step 704, the difference between desired valve timing and actual valve timing may be determined. For example, a value stored in the memory of the controller 6 can be saved as the desired valve timing. The actual valve timing determined at step 702 may be based on the output of first circuit 300 or second circuit 302 and may be compared to the desired valve timing at step 704 to determine the difference therebetween.

Then, at a step 706, a trimmed valve timing may be determined by referencing a map stored in the memory of controller 6. For example, the desired valve timing and the actual valve timing may be compared in the map to produce the trimmed valve timing. At a step 708, the trimmed valve timing may be executed, e.g., by operating fuel injector 10 according to the trimmed valve timing determined in step 706. Thus, controller 6 can determine actual valve timing and output a signal to the fuel injector 10 to start or end fuel injection based at least in part on information from the first circuit 300 or information from the second circuit 302.

The fuel injector 10 and methods disclosed herein may improve cylinder to cylinder trimming of the injection sequence from combustion cylinder to combustion cylinder of the engine. For example, such injection timing and injection duration may be trimmed. Additionally, the fuel injector 10 and the methods disclosed herein may enable more precise monitoring, control, and adjustment of the operation of fuel injector 10, including direct measurement of a start of valve and/or end of valve timing. Injector timing and duration may also be adjusted as the injector wears over time. Also, the fuel injector 10 and methods disclosed herein may improve injector diagnostics. For example, valve bounce or unstable operation may be detected. In these diagnostics, a fault may be logged if an injector responds incorrectly, which may eliminate the need to replace sets of injectors or perform a cylinder cut out detection for injector diagnostics. Accordingly, the fuel injector 10 may enable improved diagnostics for maintenance or adjustment of operation of the fuel injector 10.

It will be apparent to those skilled in the art that various modifications and variations can be made to the disclosed device without departing from the scope of the disclosure. Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A fuel injector system, comprising:
    an injector body having a proximal end and a distal end, the injector body defining a nozzle having an outlet at the distal end of the injector body;
    a spill valve fluidly connected to the outlet, the spill valve having a spill valve member movable between an open position and a closed position;
    a control valve, the control valve including a control valve member movable between an open position and a closed position;
    a spring disposed between the spill valve member and the control valve member, the spring biasing the spill valve member toward the open position and the control valve member toward the closed position;
    a check valve fluidly connected to the outlet and the control valve, the check valve including a check valve needle movable between an open position and a closed position; and
    an electrical monitoring circuit having a conductive path that includes the control valve member, the spill valve member, and the spring, the monitoring circuit configured to output a signal indicative of at least one of the open position or the closed position of the spill valve member.

2. The fuel injector system of claim 1, wherein the conductive path of the monitoring circuit is open when at least one of the spill valve member is in the closed position or the control valve member is in the open position.

3. The fuel injector system of claim 1, further including a first insulative coating between a body of the spill valve and an interior body of a fuel injector.

4. The fuel injector system of claim 3, further including a second insulative coating between a body of the control valve and a body of the check valve.

5. The fuel injector system of claim 1, further including a controller included in the monitoring circuit and configured to determine a timing at which the spill valve member is in the closed position and the control valve member is in the open position based on a state of the monitoring circuit.

6. The fuel injector system of claim 5, wherein the controller is configured to output a signal to a fuel injector to start a fuel injection or end the fuel injection based at least in part on information from the monitoring circuit.

7. The fuel injector system of claim 5, wherein the controller is configured to determine an actual injection time based at least in part on the position of the control valve member indicated by the state of the monitoring circuit, the controller being further configured to adjust operation of a fuel injector based on a comparison between the determined actual injection time and a desired injection time.

8. A fuel injector system, comprising:
    an injector body having a proximal end and a distal end, the injector body defining a nozzle having an outlet at the distal end of the injector body;
    a spill valve fluidly connected to the outlet, the spill valve having a spill valve member movable between an open position and a closed position;
    a control valve, the control valve including a control valve member movable between an open position and a closed position;
    a check valve fluidly connected to the outlet and the control valve, the check valve including a check valve member movable between an open position and a closed position;
    an electrical monitoring circuit having a conductive path including the control valve member and the spill valve member, the monitoring circuit configured to output a signal indicative of one or more of a position of the spill valve member, a position of the control valve member, or a position of the check valve member;
    a first insulating coating between a body of the spill valve in which the spill valve member is disposed and an interior body of a fuel injector; and
    a second insulating coating between a body of the control valve and a body of the check valve.

9. The fuel injector system of claim 8, wherein the conductive path of the monitoring circuit is open when at least one of the spill valve member is in the closed position or the control valve member is in the open position.

10. The fuel injector system of claim 8, further including a second insulating coating between a body of the control valve in which the control valve member is disposed and a body of the check valve.

11. The fuel injector system of claim 8, wherein the conductive path of the electrical monitoring circuit includes a spring member.

12. The fuel injector system of claim 11, wherein the spring member is disposed between the spill valve member and the control valve member.

13. The fuel injector system of claim 8, further including a controller included in the monitoring circuit and configured to determine a timing at which the spill valve member is in the closed position based on a state of the monitoring circuit.

14. The fuel injector system of claim 13, wherein the controller is configured to output a signal to start a fuel injection or end the fuel injection based at least in part on information from the monitoring circuit.

15. The fuel injector system of claim 13, wherein the controller is configured to determine an actual injection time based at least in part on the position of the control valve member indicated by the state of the monitoring circuit, the controller being further configured to adjust operation of a fuel injector based on a comparison between the determined actual injection time and a desired injection time.

16. The fuel injector system of claim 8, wherein the spill valve member and the control valve member are conductive elements in electrical communication with each other.

17. A fuel injector system, comprising:
an injector body having a proximal end and a distal end, the injector body defining a nozzle having an outlet at the distal end of the injector body;
a spill valve fluidly connected to the outlet, the spill valve having a spill valve member movable between an open position and a closed position in response to electrical energy supplied to a first solenoid;
a control valve, the control valve including a control valve member movable between an open position and a closed position in response to electrical energy supplied to a second solenoid;
a check valve fluidly connected to the outlet and the control valve;
a spring disposed between the spill valve member and the control valve member; and
an electrical monitoring circuit having a conductive path that includes the control valve member and the spill valve member, such that, in a first state, the spill valve member opens the electrical monitoring circuit, and, in a second state, the control valve opens the electrical monitoring circuit.

18. The fuel injector system of claim 17, wherein a spring biases the spill valve member toward the open position.

19. The fuel injector system of claim 17, wherein the check valve includes a check valve member, and wherein the check valve member is included in the conductive path of the electrical monitoring circuit.

* * * * *